United States Patent
Gamon et al.

(10) Patent No.: US 9,262,397 B2
(45) Date of Patent: Feb. 16, 2016

(54) GENERAL PURPOSE CORRECTION OF GRAMMATICAL AND WORD USAGE ERRORS

(75) Inventors: Michael Gamon, Seattle, WA (US); Christian König, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 639 days.

(21) Appl. No.: 12/961,516

(22) Filed: Dec. 7, 2010

(65) Prior Publication Data

US 2012/0089387 A1 Apr. 12, 2012

Related U.S. Application Data

(60) Provisional application No. 61/391,197, filed on Oct. 8, 2010.

(51) Int. Cl.

| | |
|---|---|
| *G10L 15/00* | (2013.01) |
| *G10L 15/19* | (2013.01) |
| *G10L 15/183* | (2013.01) |
| *G06F 17/20* | (2006.01) |
| *G06F 17/27* | (2006.01) |

(52) U.S. Cl.
CPC .............. *G06F 17/274* (2013.01); *G06F 17/20* (2013.01); *G10L 15/00* (2013.01); *G10L 15/183* (2013.01); *G10L 15/19* (2013.01); *G06F 17/27* (2013.01)

(58) Field of Classification Search
USPC ........... 704/1, 4–8, 9, 10, 251–257, 270, 276, 704/E15.019–E15.024, E11.001–E11.007, 704/E13.001–E13.014; 707/758–759, 765
See application file for complete search history.

(56) References Cited

U.S. PATENT DOCUMENTS

| | | | |
|---|---|---|---|
| 4,674,065 A | | 6/1987 | Lange |
| 4,730,269 A | * | 3/1988 | Kucera .................. G06F 17/273 400/63 |
| 4,771,401 A | * | 9/1988 | Kaufman et al. ............. 715/206 |
| 4,868,750 A | * | 9/1989 | Kucera et al. ...................... 704/8 |
| 5,477,448 A | * | 12/1995 | Golding et al. ................... 704/9 |
| 5,485,372 A | * | 1/1996 | Golding et al. ................... 704/9 |

(Continued)

OTHER PUBLICATIONS

Jager et al., "Learning Lexical Collocations with Concordancing and Scaffolding", Retrieved at << http://clic.cimec.unitn.it/marco/publications/It_Journ_Lings.submitted.pdf >>,Jul. 7, 2010, pp. 95.

(Continued)

*Primary Examiner* — Pierre-Louis Desir
*Assistant Examiner* — David Kovacek
(74) *Attorney, Agent, or Firm* — Alin Corie; Cassandra T. Swain; Micky Minhas

(57) ABSTRACT

Architecture that detects and corrects writing errors in a human language based on the utilization of three different stages: error detection, correction candidate generation, and correction candidate ranking. The architecture is a generic framework for generating fluent alternatives to non-grammatical word sequences in a written sample. Error detection is addressed by a suite of language model related scores and other scores such as parse scores that can identify a particularly unlikely sequence of words. Correction candidate generation is addressed by a lookup in a very large corpus of "correct" English that looks for alternative arrangements of the same or similar words or subsequences of these words in the same context. Correction candidate ranking is addressed by a language model ranker.

19 Claims, 9 Drawing Sheets

(56) References Cited

U.S. PATENT DOCUMENTS

| | | | |
|---|---|---|---|
| 5,490,061 A * | 2/1996 | Tolin et al. | 704/2 |
| 5,537,317 A | 7/1996 | Schabes et al. | |
| 5,577,249 A * | 11/1996 | Califano | 707/694 |
| 5,799,269 A | 8/1998 | Schabes | |
| 5,845,306 A | 12/1998 | Schabes et al. | |
| 5,855,000 A * | 12/1998 | Waibel et al. | 704/235 |
| 6,064,959 A * | 5/2000 | Young et al. | 704/251 |
| 6,173,252 B1 | 1/2001 | Qiu et al. | |
| 6,205,261 B1 * | 3/2001 | Goldberg | 382/310 |
| 6,401,060 B1 * | 6/2002 | Critchlow et al. | 704/1 |
| 6,424,983 B1 * | 7/2002 | Schabes et al. | 715/257 |
| 6,618,697 B1 * | 9/2003 | Kantrowitz et al. | 703/22 |
| 6,691,088 B1 | 2/2004 | Blasig | |
| 6,816,830 B1 * | 11/2004 | Kempe | G06F 17/2715 704/257 |
| 7,003,446 B2 | 2/2006 | Trower et al. | |
| 7,043,422 B2 | 5/2006 | Gao | |
| 7,120,582 B1 | 10/2006 | Young et al. | |
| 7,165,019 B1 * | 1/2007 | Lee | G06F 17/2715 704/10 |
| 7,366,983 B2 * | 4/2008 | Brill | G06F 17/273 715/257 |
| 7,447,627 B2 | 11/2008 | Jessee et al. | |
| 7,539,619 B1 * | 5/2009 | Seligman | G06F 17/2755 704/2 |
| 7,574,348 B2 | 8/2009 | Hon et al. | |
| 7,587,308 B2 * | 9/2009 | Kasravi | G06F 17/273 382/229 |
| 7,680,649 B2 | 3/2010 | Park | |
| 7,702,512 B2 * | 4/2010 | Gopinath et al. | 704/270 |
| 7,774,193 B2 | 8/2010 | Gao et al. | |
| 7,809,744 B2 * | 10/2010 | Nevidomski | G06F 17/30985 707/759 |
| 7,835,902 B2 * | 11/2010 | Gamon et al. | 704/9 |
| 8,086,453 B2 * | 12/2011 | Detlef et al. | 704/235 |
| 8,170,868 B2 * | 5/2012 | Gamon et al. | 704/9 |
| 8,386,234 B2 * | 2/2013 | Uchimoto et al. | 704/4 |
| 8,661,012 B1 * | 2/2014 | Baker | G06F 17/30 707/705 |
| 2002/0128821 A1 * | 9/2002 | Ehsani | G10L 15/193 704/10 |
| 2003/0036900 A1 * | 2/2003 | Weise | 704/9 |
| 2003/0120481 A1 | 6/2003 | Murata et al. | |
| 2003/0229497 A1 * | 12/2003 | Wilson | G09B 5/04 704/270.1 |
| 2004/0024601 A1 * | 2/2004 | Gopinath et al. | 704/270 |
| 2004/0098263 A1 | 5/2004 | Hwang et al. | |
| 2004/0122656 A1 * | 6/2004 | Abir | G06F 17/2872 704/4 |
| 2004/0138881 A1 | 7/2004 | Divay et al. | |
| 2005/0075877 A1 | 4/2005 | Minamino et al. | |
| 2006/0241944 A1 | 10/2006 | Potter et al. | |
| 2006/0247912 A1 * | 11/2006 | Suzuki et al. | 704/1 |
| 2006/0277029 A1 * | 12/2006 | Green et al. | 704/4 |
| 2006/0277031 A1 | 12/2006 | Ramsey | |
| 2007/0219776 A1 * | 9/2007 | Gamon et al. | 704/9 |
| 2008/0109209 A1 | 5/2008 | Fraser et al. | |
| 2008/0162132 A1 | 7/2008 | Doulton | |
| 2008/0208567 A1 | 8/2008 | Brockett et al. | |
| 2008/0270118 A1 * | 10/2008 | Kuo | G06F 17/273 704/9 |
| 2009/0048833 A1 | 2/2009 | Fritsch et al. | |
| 2010/0049498 A1 | 2/2010 | Cao et al. | |
| 2010/0082348 A1 | 4/2010 | Silverman et al. | |
| 2010/0138210 A1 | 6/2010 | Seo | |
| 2010/0180198 A1 | 7/2010 | Iakobashvili | |
| 2010/0185435 A1 | 7/2010 | Deshmukh et al. | |
| 2011/0087961 A1 * | 4/2011 | Fitusi | G06F 17/276 715/261 |
| 2011/0161072 A1 | 6/2011 | Terao et al. | |
| 2011/0184723 A1 * | 7/2011 | Huang et al. | 704/8 |
| 2011/0202876 A1 * | 8/2011 | Badger | G06F 3/0237 715/816 |
| 2011/0282667 A1 * | 11/2011 | Hernandez-Abrego | 704/254 |
| 2012/0029910 A1 * | 2/2012 | Medlock | G06F 3/0237 704/9 |
| 2012/0089387 A1 * | 4/2012 | Gamon et al. | 704/9 |
| 2012/0101804 A1 | 4/2012 | Roth et al. | |
| 2012/0239379 A1 | 9/2012 | Gershnik | |
| 2013/0304453 A9 | 11/2013 | Fritch et al. | |

OTHER PUBLICATIONS

Yi, et al., "AWeb-based English Proofing System for English as a Second Language Users", Retrieved at << http://citeseerx.ist.psu.edu/viewdoc/download?doi=10.1.1.68.9984&rep=rep1&type=pdf >>, Retrieved date: Sep. 28, 2010, pp. 6.

Onnis, et al., "Generalizable distributional regularities aid fluent language processing: The case of semantic valence tendencies", Retrieved at http://clic.cimec.unitn.it/marco/publications/It_Journ_Lings.submitted.pdf >>, Retrieved Date: Sep. 28, 2010, pp. 50.

Athanaselis, T., S. Bakamidis, I. Dologlou, A novel technique for words reordering based on N-grams, 9th International Symposium on Signal Processing and Its Applications, ISSPA 2007, Feb. 12-15, 2007, pp. 1-4, Sharjah, United Arab Emirates.

Dagan, I., L. Lee, F. C. N. Pereira, Similarity-based models of word cooccurrence probabilities, Machine Learning, Feb. 1999, vol. 34, No. 1-3, pp. 43-69.

Wang, K., C. Thrasher, E. Viegas, X. Li, P. Hsu, An overview of Microsoft Web N-gram corpus and applications, Proc. of the NAACL HLT 2010: Demonstration Session, Jun. 2010, pp. 45-48, Los Angeles, California.

Spooner, L., Notice of Allowance, U.S. Appl. No. 13/193,248, May 29, 2014, pp. 1-10.

* cited by examiner

GENERAL PURPOSE CORRECTION OF GRAMMATICAL AND WORD USAGE ERRORS

CROSS-REFERENCE TO RELATED APPLICATIONS

This application claims the benefit of U.S. Provisional Patent application Ser. No. 61/391,197 entitled "GENERAL PURPOSE CORRECTION OF GRAMMATICAL AND WORD USAGE ERRORS" and filed Oct. 8, 2010, the entirety of which is incorporated by reference herein.

BACKGROUND

There continues to be research and proposed solutions to grammar checking and word usage errors. What these solutions have in common is the targeted design for specific types of errors. For example, in a word processor, grammar checking is one of the processes the word processor was designed to do effectively. Where there is a subject-word agreement problem where the number on the verb does not agree with the number of the subject, the checker can handle this with a high degree of success. These grammar checkers are designed to target a specific set of errors, such as subject-verb disagreement.

Similarly, with respect to learning the English language and grammar, a daunting task for non-English speaking users, typical systems for automatic error correction and detection are designed by identifying the typical errors made, and then developing specialized subsystems that target a specific error. For example, prepositions are difficult for learners because prepositional systems across languages are very different. Thus, a typical system design for automatic correction of learner language specifically looks at preposition errors. To do so, it may consider the assigned part of speech tag for each of the words in a sentence, and then identify noun phrases based on the tags. Further analysis checks whether a preposition precedes the noun phrase and determines which preposition would be the best choice, given the words and parts-of-speech in the context.

These more focused designs employ different models from which to check if the preposition entered by the user was correct, and if no preposition precedes the noun phrase, another model from which to determine if a preposition should be present in this context. The more focused designs are costly in terms of performance and maintenance, since each error type amongst a potentially large set requires its own targeted sub-component.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture is a general-purpose framework for the generation of fluent alternatives to dysfluent or ungrammatical word sequences (e.g., in a written sample), such as the correction of grammatical and word usage errors, whether the errors are related to fluency, prepositions, articles, form of verb, or other word choices. The architecture detects and corrects writing errors in a human language based on the utilization of three different stages: error detection, correction candidate generation, and correction candidate ranking in terms of fluency.

Error detection is addressed by a suite of language model related scores and possibly other scores that can identify a particularly unlikely sequence of words. Correction candidate generation is addressed by a lookup in a very large corpus of "correct" English that looks for alternative arrangements of the same or similar words or subsequences of these words in the same context. Correction candidate ranking is addressed by a language model ranker.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
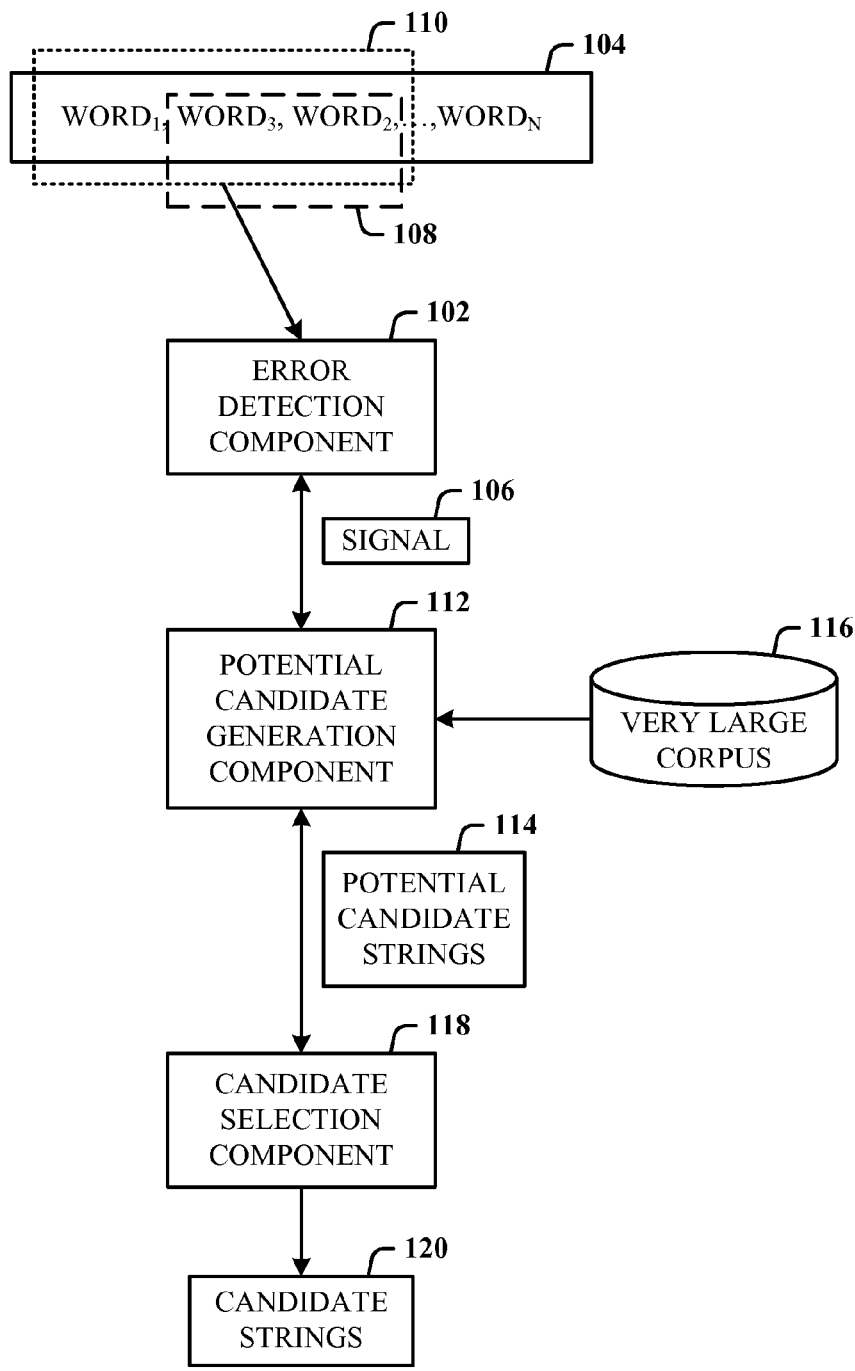
FIG. 1 illustrates a computer-implemented error correction system in accordance with the disclosed architecture.

The disclosed architecture is a system that addresses grammatical and word usage correction in a general way (without targeting specific error types with specific mechanisms). The architecture detects and corrects any type of error that manifests itself in the choice or ordering of words, and thus, is capable of achieving higher coverage than current error detection systems or proofing tools.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented error correction system 100 in accordance with the disclosed architecture. The system 100 includes an error detection component 102 that collects scores based on word usage in a sequence 104 of words intended to form a fluent language expression (e.g., a sentence). The error detection component 102 generates a signal 106 (overall score) for presence of an error in a subsequence of words 108 (erroneous subsequence of words) of the sequence 104 based on the scores, and detects the erroneous subsequence of words 108 in the sequence 104 (also referred to as the intended fluent language expression or intended expression). A sliding window 110 defines the number of words of the sequence 104 being processed for error correction at any moment in time. A potential candidate generation component 112 generates potential candidate strings 114 from a corpus 116. A candidate selection component 118 selects and presents one or more of the potential candidate strings 114 as candidate strings 120 for correction of language fluency introduced by the erroneous subsequence of words 108.

The error detection component 102 detects the erroneous subsequence of words 108 based on scores from at least one of multiple language models or phrase count tables that detect an unlikely sequence of words. The error detection component 102 operates as the sliding window 110 over sequences of words of the sequence 104. The candidate selection component 118 selects a candidate string based on a score of the potential candidate strings 114 from an associated language model. The scores for error detection can be used as features in a classification or sequence model that learns how scores of the language models indicate presence of the erroneous subsequence of words 108. The corpus 116 used by the potential candidate generation component 112 can be represented as a suffix array to increase efficiency of lookup.

The potential candidate generation component 112 generates the potential candidate strings 114 based on context. The potential candidate generation component 112 generates the potential candidate strings 114 based on comparison of the number of words in the potential candidate strings 114 to the number of words in the erroneous subsequence of words 108. The potential candidate generation component 112 generates the potential candidate strings 114 based on the number of words in the potential candidate strings 114 that match words in the erroneous subsequence of words 108.

Note that although a single signal is described as one implementation of use, multiple signals can be generated and then combined for an overall measure of error detection. For example, one or more signals from linguistic analysis can be employed in addition to language model scores, such as signals based on parse trees and dependency tuples. Machine learning can then be employed in a classifier or sequence modeling approach that operates on a given word of the input sequence 104. Moreover, the resources accessible for error detection are not limited to language models and linguistic analysis, but can include many different sources of information, such as web-based frequency information.

Figure 2:
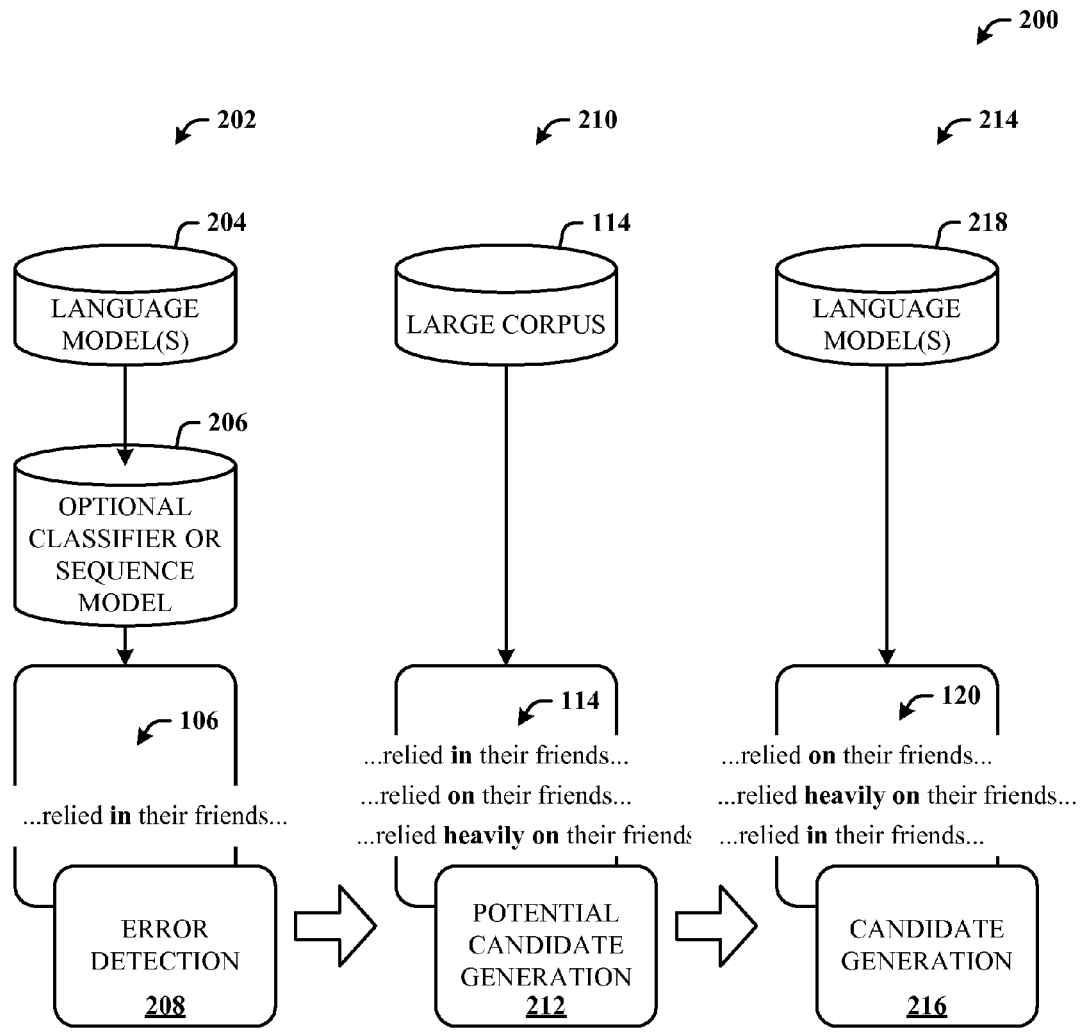
FIG. 2 illustrates a general-purpose error correction system in accordance with the disclosed architecture.

FIG. 2 illustrates a general-purpose error correction system 200 in accordance with the disclosed architecture. An error detection phase 202 of the system 200 includes one or more language models 204 the output of which is to an optional classifier or sequence model 206. There are many algorithms for sequence modeling that can be employed, including, but not limited to, hidden Markov models (HMMs), conditional Markov model (CMM), maximum entropy Markov model (MEMM), conditional random field (CRF), etc.

The general-purpose error detection system 200 employs one or more large language models 204 (and/or word and phrase count tables) as resources, and calculates one or more scores computed from these resources in the sliding window 110 (over the subsequence of words 108) over the input sentence (sequence of words 104).

Generally, a sequence of reasonably common words, where the sequence itself is highly unlikely can indicate an area in the input string (e.g., sentence) where there could be one or more errors (e.g., word ordering). The scores can also be used as features in a classification or sequence modeling approach, which can be trained on annotated error data. Such an algorithm learns how the different language model scores provide a signal for the presence of an error. Output of the language model(s) 204 or, the optional classifier or sequence model 206, is to an error detection process 208 (of the error detection component 102). The error detection process 208 detects an error in the word sequence defined by the sliding window 110, generates and sends a score for presence of an error to a potential candidate generation phase 210.

The potential candidate generation phase 210 includes a potential candidate generation process 212 (of the potential candidate generation component 112) that generates the potential candidate strings 114 from the corpus 116. The algorithm for generating the potential candidate strings 114 can comprise a lookup in a very large corpus (e.g., the corpus 116). In one particular instantiation the corpus 116 can be represented as a suffix array, for efficient lookup.

Once the error detection phase 202 has determined that a sequence of words (defined by the sliding window 110) might contain one or more errors, the potential candidate strings 114 are generated. The potential candidate generation process 210 finds all potential candidate strings 114 in the corpus 116 based on one or more of the following criteria, for example (note that other criteria may be employed):

(i) the strings occur in the same context, where context can be defined as "preceded and followed by the same word or words";

(ii) the strings are of the same length or within no more than m words compared to the original string;

(iii) the strings contain at least n words from the original string;

(iv) the strings contain words that are semantically similar to the words in the original string; and (v) the strings contain words that are morphologically similar to the words in original string (i.e., contain the same stem, but a different suffix)

These criteria can be heuristically determined or can be optimized (i.e. optimal values for m can be found, optimal range of context can be defined) by maximizing the number of valid correction candidate strings 114 on an annotated corpus.

Once a set of potential correction candidate strings 114 has been identified, the candidate generation process 216 (of the potential candidate generation component 112) in a final candidate generation phase 214 selects and presents one or more of the potential candidate strings 114 as the candidate strings 120 for correction of the error(s) in the sequence 104. Selection can be by ranking the potential candidate strings 114 so that only the top t candidates are shown to the user. This phase 214 can be implemented as one or more language models 218 that rank the potential candidate strings 114 in the context of the complete user input. Only potential candidate strings that rank higher than the original input (e.g., word sequence defined by the window 110) are considered to be valid options, for example, and of those, only a subset may be presented to the user.

A language model assigns a probability to a sequence of m words.

$$P(w_1, \ldots w_m) = \prod_{i=1}^{m} P(w_i \mid w_1, \ldots, w_{i-1})$$

$$\approx \prod_{i=1}^{m} P(w_i \mid w_{i-(n-1)}, \ldots, w_{i-1})$$

Figure 3:
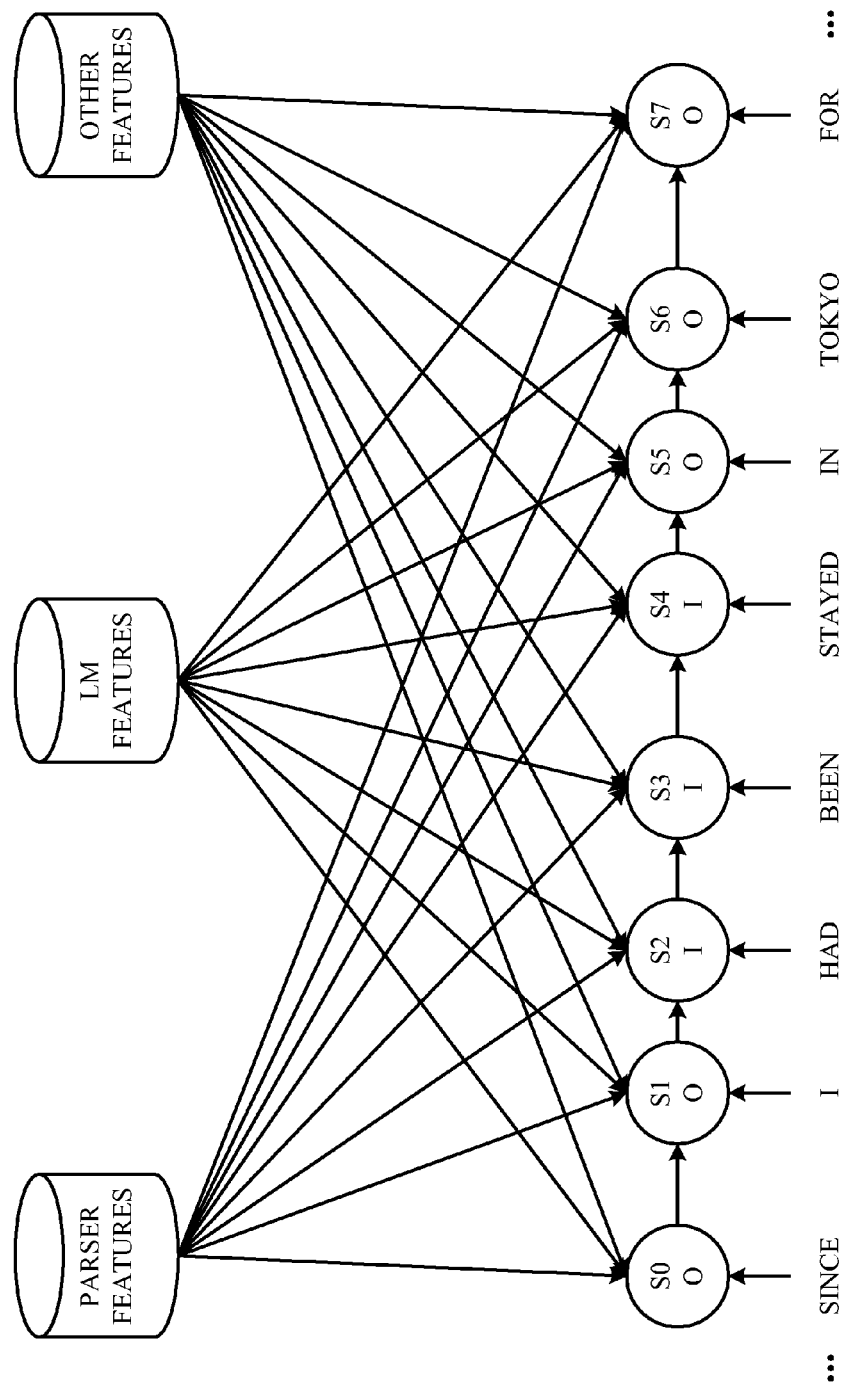
FIG. 3 illustrates an exemplary process for detecting an error in a sequence of words.

FIG. 3 illustrates an exemplary process 300 that detects an error in a sequence of words. Note however, this sequence model is only but one instantiation that can be employed for error correction in accordance with the disclosed architecture. This can be accomplished using a conditional Markov model, maximum entropy Markov model, or other suitable models. Here, parser features, language model features, and other features are utilized to make a determination of whether a sequence of words is in a state that is outside of the error (denoted by "O") or inside the error (denoted "I"). In this example, the words (or sequence members Sx) "had", "been", and "stayed" are labeled as inside the error bound(s).

Figure 4:
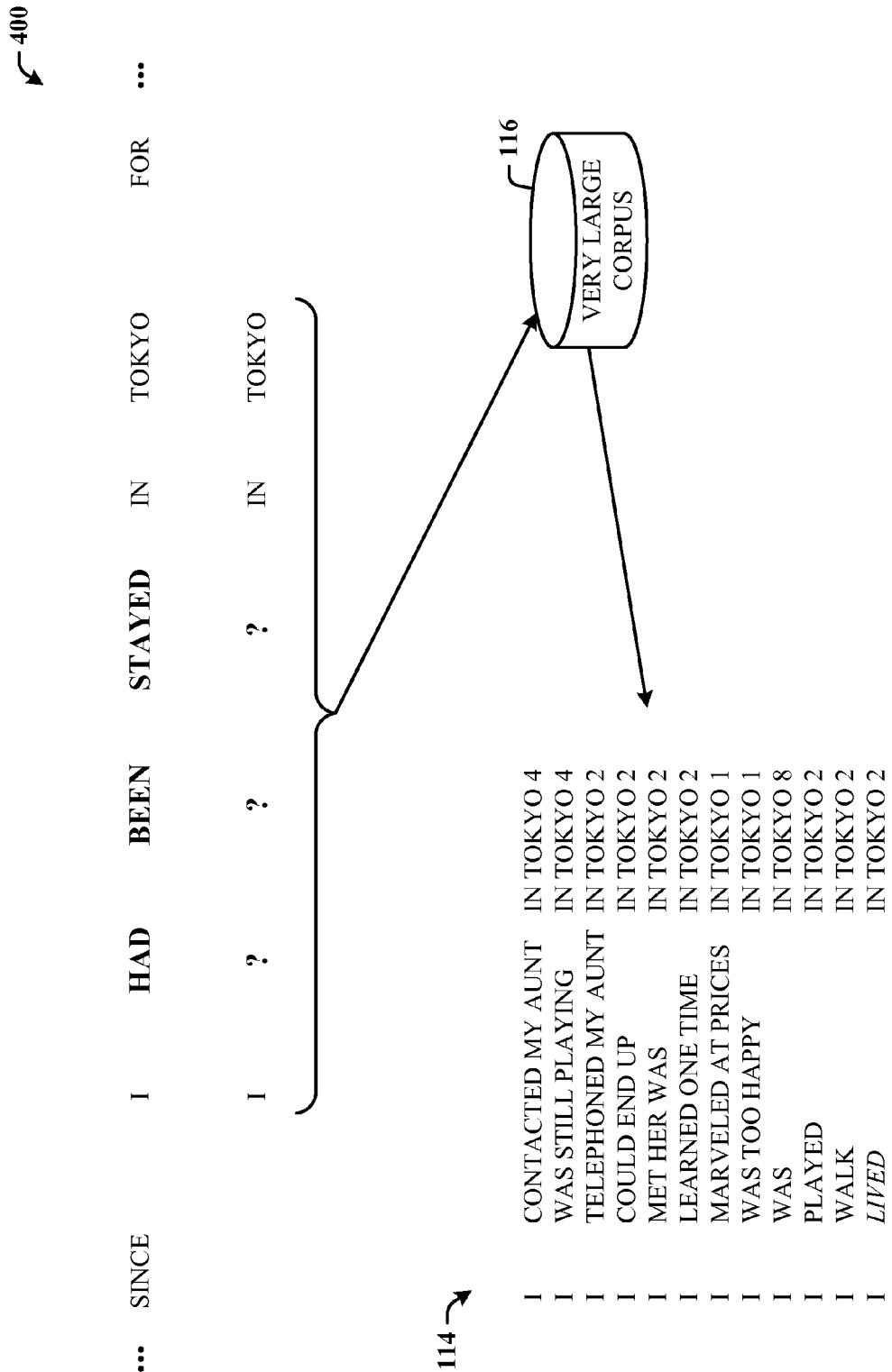
FIG. 4 illustrates the potential candidate generation phase for potential candidate strings that are generated from a large corpus for the detected error in the sequence of FIG. 3.

FIG. 4 illustrates the potential candidate generation phase 210 for potential candidate strings 114 that are generated from a large corpus (e.g., corpus 116) for the detected error in the sequence of FIG. 3. Note that in this case, the potential candidate strings 114 are not yet ranked to provide the candidate strings 120. The selection process, which can be based on ranking, is a later process.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
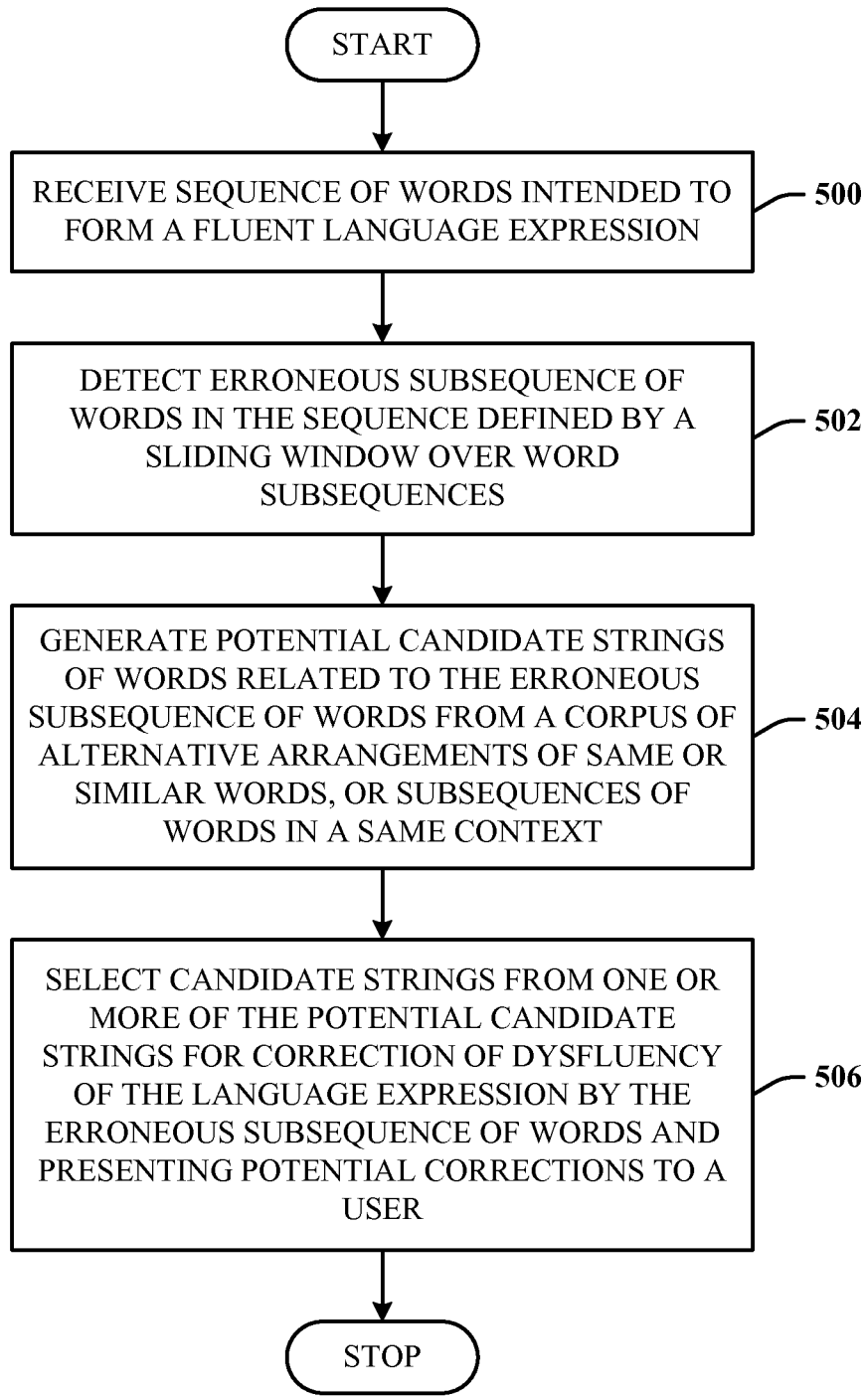
FIG. 5 illustrates a computer-implemented error correction method in accordance with the disclosed architecture.

FIG. 5 illustrates a computer-implemented error correction method in accordance with the disclosed architecture. At 500, a sequence of words intended to form a fluent language expression is received. At 502, an erroneous subsequence of words is detected in the sequence defined by a sliding window over word subsequences. At 504, potential candidate strings of words related to the erroneous subsequence of words are generated from a corpus of alternative arrangements of same or similar words, or subsequences of words in a same context. At 506, candidate strings are selected from one or more of the potential candidate strings for correction of dysfluency of the language expression by the erroneous subsequence of words and are presented as potential corrections to the user.

Figure 6:
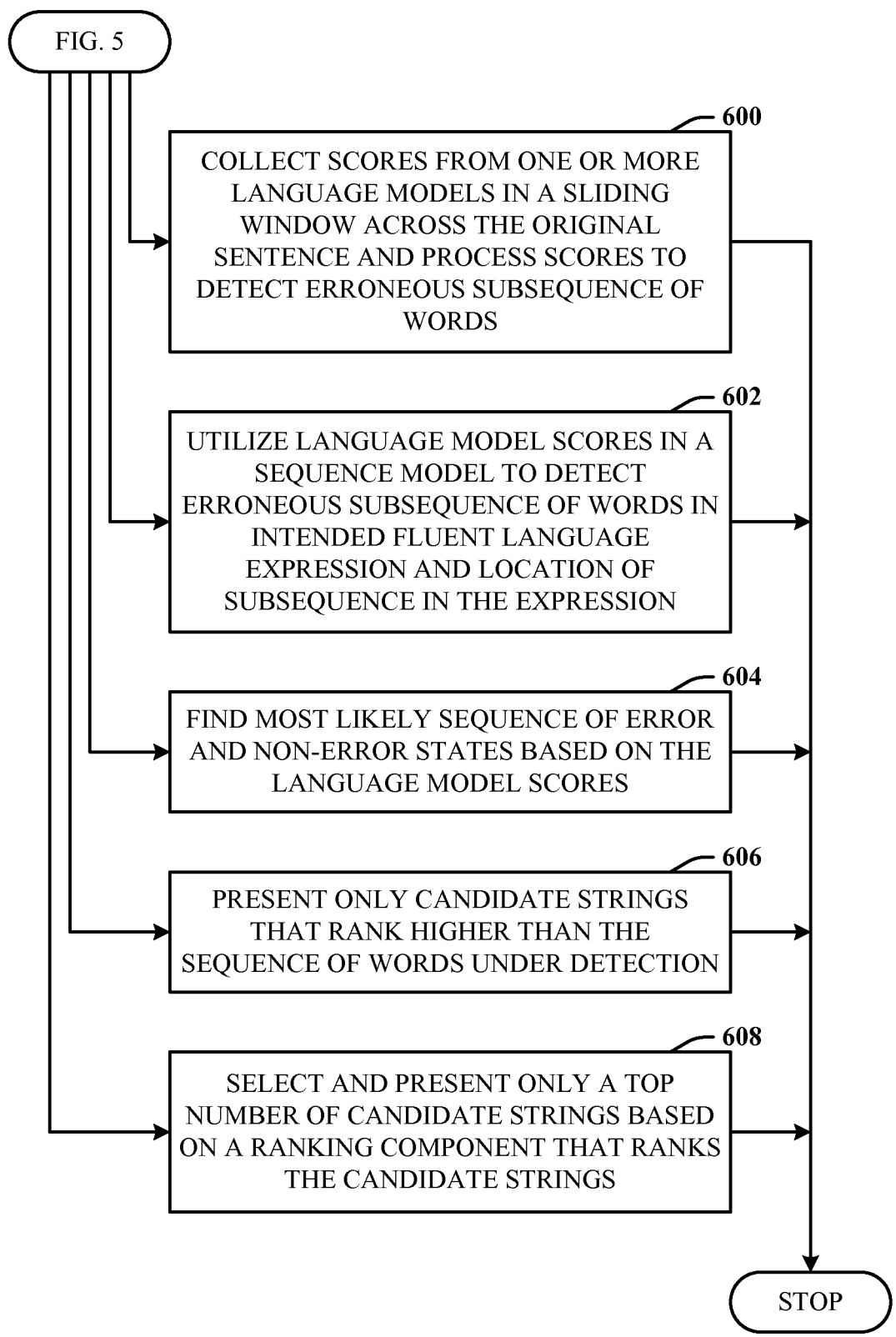
FIG. 6 illustrates further aspects of the method of FIG. 5.

FIG. 6 illustrates further aspects of the method of FIG. 5. Note that the flow indicates that each block can represent a step that can be included, separately or in combination with other blocks, as additional aspects of the method represented by the flow chart of FIG. 5. At 600, scores are collected from one or more language models and processed to detect the erroneous subsequence of words. At 602, the language model scores are utilized in a sequence model to detect the erroneous subsequence of words in the intended fluent language expression and location of the subsequence in the expression. At 604, a most likely sequence of error and non-error states is found based on the language model scores. At 606, only candidate strings are presented that rank higher than the sequence of words under detection, where ranking can be determined by a language model. At 608, only a top number of candidate strings is selected and presented based on a ranking component that ranks the candidate strings.

Figure 7:
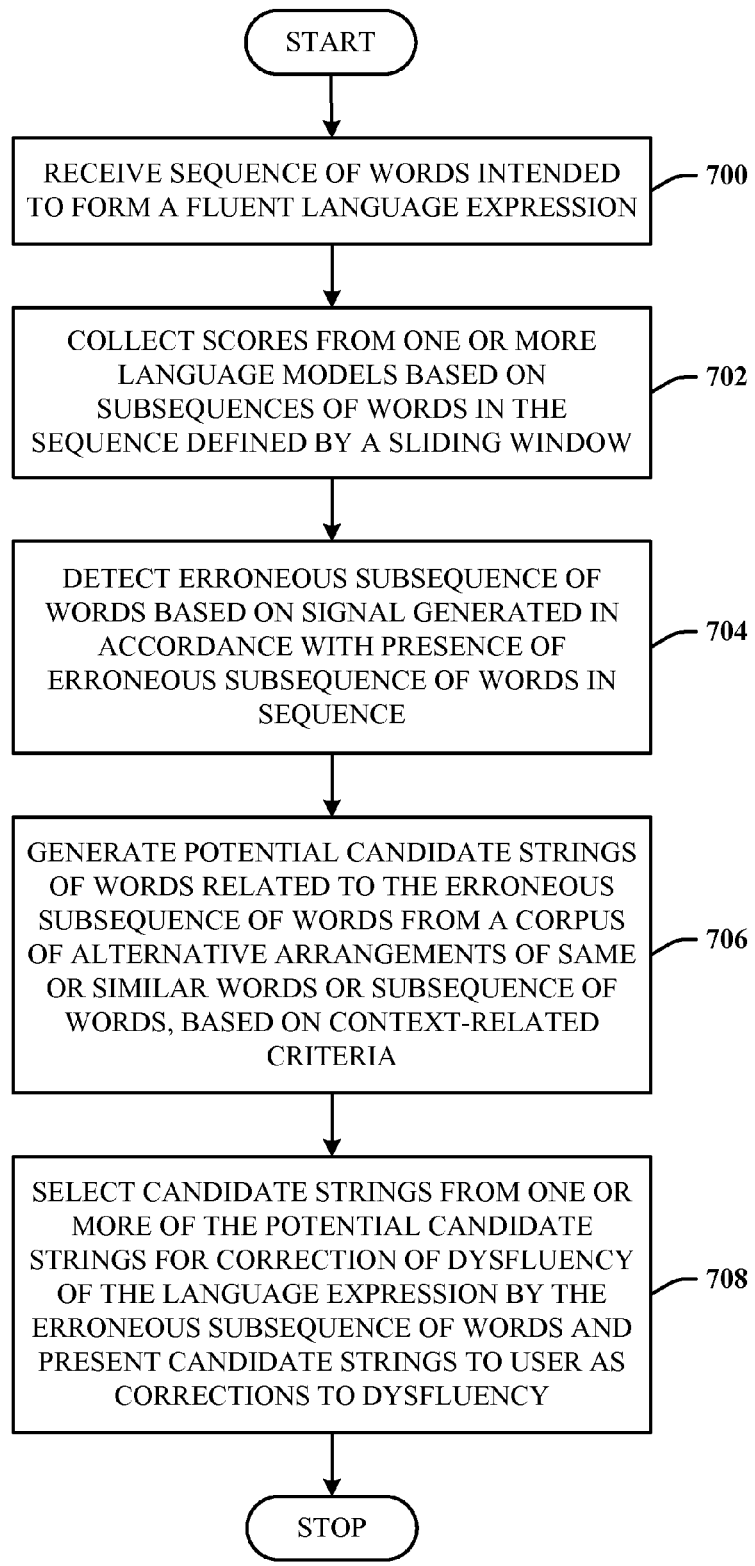
FIG. 7 illustrates an alternative computer-implemented error correction method in accordance with the disclosed architecture.

FIG. 7 illustrates an alternative computer-implemented error correction method in accordance with the disclosed architecture. At 700, a sequence of words intended to form a fluent language expression is received. At 702, scores from one or more language models are collected based on subsequences of words in the sequence defined by a sliding window. At 704, an erroneous subsequence of words is detected based on a signal generated in accordance with presence of the erroneous sequence of words in the sequence. At 706, potential candidate strings of words related to the erroneous subsequence of words are generated from a corpus of alternative arrangements of same or similar words or subsequences of words, based on context-related criteria. At 708, candidate strings are selected from one or more of the potential candidate strings for correction of dysfluency of the language expression by the erroneous subsequence of words and candidate strings are presented to a user as corrections of the dysfluency.

Figure 8:
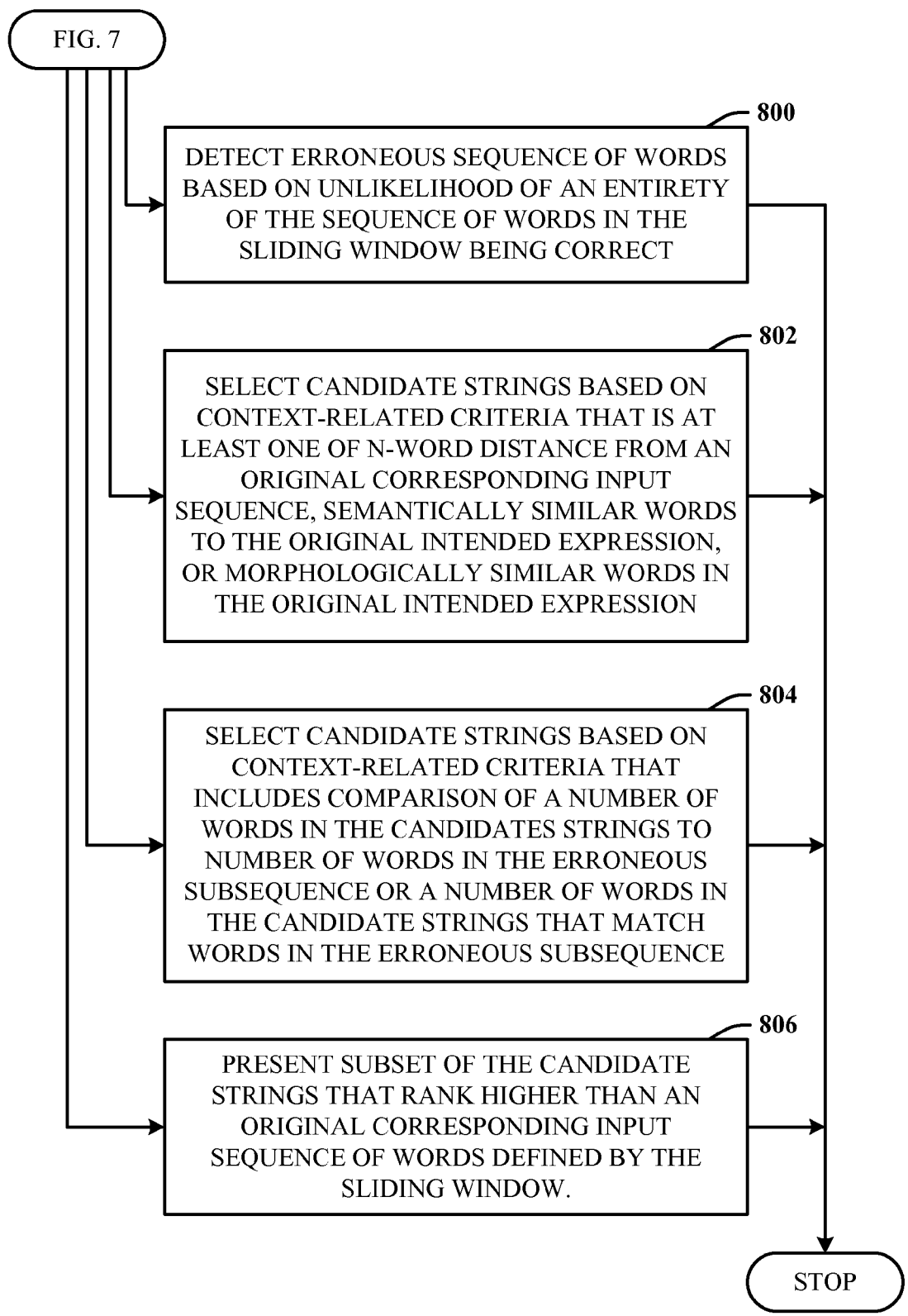
FIG. 8 illustrates further aspects of the method of FIG. 7.

FIG. 8 illustrates further aspects of the method of FIG. 7. Note that the flow indicates that each block can represent a step that can be included, separately or in combination with other blocks, as additional aspects of the method represented by the flow chart of FIG. 7. At 800, the erroneous sequence of words is detected based on unlikelihood of an entirety of the sequence of words in the sliding window being correct. At 802, the candidate strings are selected based on context-related criteria that are at least one of n-word distance from an original corresponding input sequence, semantically similar words to the original intended expression, or morphologically similar words in the original intended expression. At 804, the candidate strings are selected based on context-related criteria that include comparison of a number of words in the candidate strings to number of words in the erroneous subsequence or a number of words in the candidate strings that match words in the erroneous subsequence. At 806, a subset of the candidate strings that rank higher than an original corresponding input sequence of words defined by the sliding window is presented.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 9:
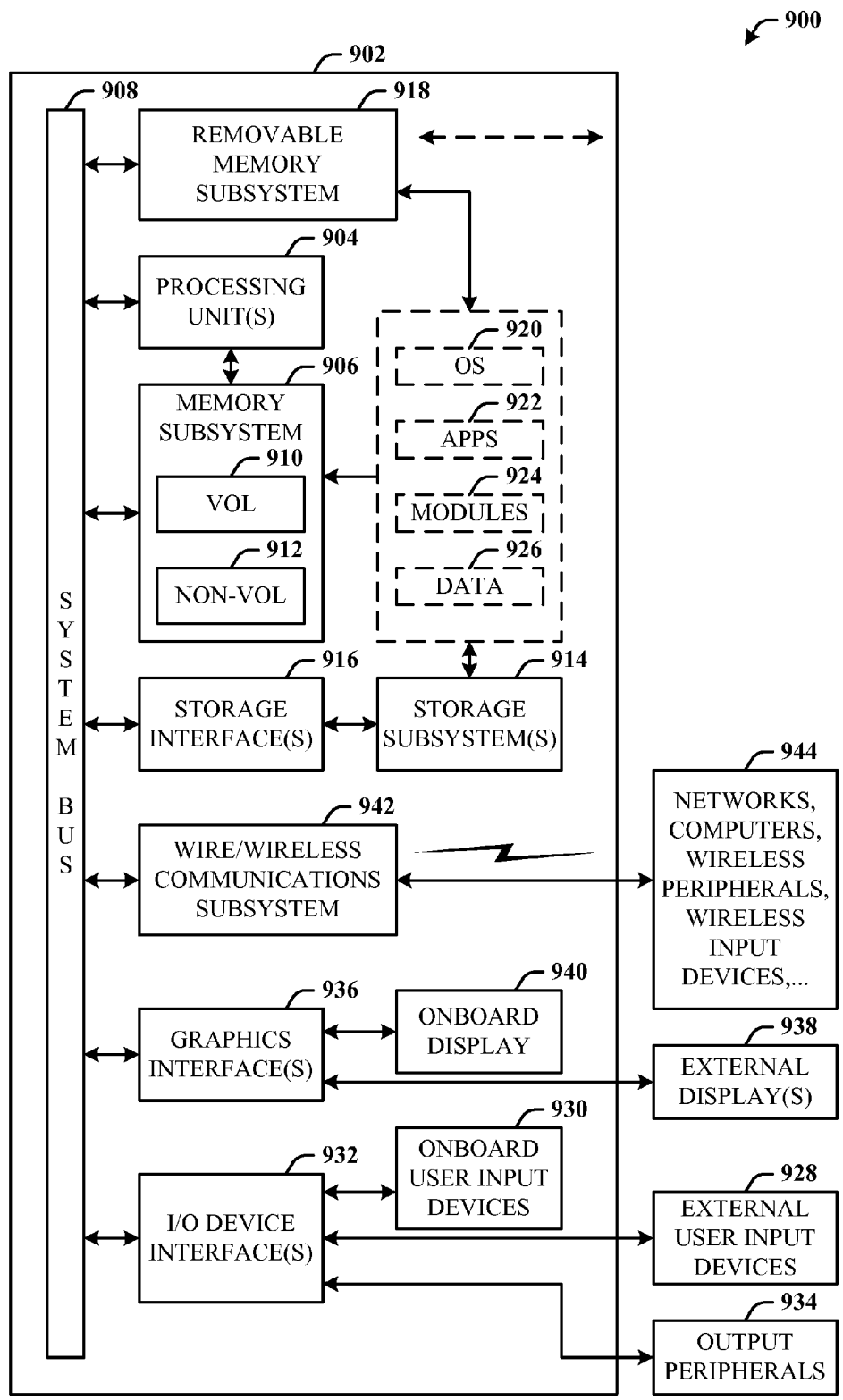
FIG. 9 illustrates a block diagram of a computing system that executes error correction in accordance with the disclosed architecture.

Referring now to FIG. 9, there is illustrated a block diagram of a computing system 900 that executes error correction in accordance with the disclosed architecture. However, it is appreciated that the some or all aspects of the disclosed methods and/or systems can be implemented as a system-on-a-chip, where analog, digital, mixed signals, and other functions are fabricated on a single chip substrate. In order to provide additional context for various aspects thereof, FIG. 9 and the following description are intended to provide a brief, general description of the suitable computing system 900 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 900 for implementing various aspects includes the computer 902 having processing unit(s) 904, a computer-readable storage such as a system memory 906, and a system bus 908. The processing unit(s) 904 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 906 can include computer-readable storage (physical storage media) such as a volatile (VOL) memory 910 (e.g., random access memory (RAM)) and non-volatile memory (NON-VOL) 912 (e.g., ROM, EPROM, EEPROM, etc.). A basic input/output system (BIOS) can be stored in the non-volatile memory 912, and includes the basic routines that facilitate the communication of data and signals between components within the computer 902, such as during startup. The volatile memory 910 can also include a high-speed RAM such as static RAM for caching data.

The system bus 908 provides an interface for system components including, but not limited to, the system memory 906 to the processing unit(s) 904. The system bus 908 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 902 further includes machine readable storage subsystem(s) 914 and storage interface(s) 916 for interfacing the storage subsystem(s) 914 to the system bus 908 and other desired computer components. The storage subsystem(s) 914 (physical storage media) can include one or more of a hard disk drive (HDD), a magnetic floppy disk drive (FDD), and/or optical disk storage drive (e.g., a CD-ROM drive DVD drive), for example. The storage interface(s) 916 can include interface technologies such as EIDE, ATA, SATA, and IEEE 1394, for example.

One or more programs and data can be stored in the memory subsystem 906, a machine readable and removable memory subsystem 918 (e.g., flash drive form factor technology), and/or the storage subsystem(s) 914 (e.g., optical, magnetic, solid state), including an operating system 920, one or more application programs 922, other program modules 924, and program data 926.

The one or more application programs 922, other program modules 924, and program data 926 can include the entities and components of the system 100 of FIG. 1, the entities and components of the system 200 of FIG. 2, the entities and flow of the process 300 of FIG. 3, the entities and flow of the diagram 400 of FIG. 4, and the methods represented by the flowcharts of FIGS. 5-8, for example.

Generally, programs include routines, methods, data structures, other software components, etc., that perform particular tasks or implement particular abstract data types. All or portions of the operating system 920, applications 922, modules 924, and/or data 926 can also be cached in memory such as the volatile memory 910, for example. It is to be appreciated that the disclosed architecture can be implemented with various commercially available operating systems or combinations of operating systems (e.g., as virtual machines).

The storage subsystem(s) 914 and memory subsystems (906 and 918) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 902 and includes volatile and non-volatile internal and/or external media that is removable or non-removable. For the computer 902, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 902, programs, and data using external user input devices 928 such as a keyboard and a mouse. Other external user input devices 928 can include a microphone, an IR (infrared) remote control, a joystick, a game pad, camera recognition systems, a stylus pen, touch screen, gesture systems (e.g., eye movement, head movement, etc.), and/or the like. The user can interact with the computer 902, programs, and data using onboard user input devices 930 such a touchpad, microphone, keyboard, etc., where the computer 902 is a portable computer, for example. These and other input devices are connected to the processing unit(s) 904 through input/output (I/O) device interface(s) 932 via the system bus 908, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 932 also facilitate the use of output peripherals 934 such as printers, audio devices, camera devices, and so on, such as a sound card and/or onboard audio processing capability.

One or more graphics interface(s) 936 (also commonly referred to as a graphics processing unit (GPU)) provide graphics and video signals between the computer 902 and external display(s) 938 (e.g., LCD, plasma) and/or onboard displays 940 (e.g., for portable computer). The graphics interface(s) 936 can also be manufactured as part of the computer system board.

The computer 902 can operate in a networked environment (e.g., IP-based) using logical connections via a wired/wireless communications subsystem 942 to one or more networks and/or other computers. The other computers can include workstations, servers, routers, personal computers, microprocessor-based entertainment appliances, peer devices or other common network nodes, and typically include many or all of the elements described relative to the computer 902. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 902 connects to the network via a wired/wireless communication subsystem 942 (e.g., a network interface adapter, onboard transceiver subsystem, etc.) to communicate with wired/wireless networks, wired/wireless printers, wired/wireless input devices 944, and so on. The computer 902 can include a modem or other means for establishing communications over the network. In a networked environment, programs and data relative to the computer 902 can be stored in the remote memory/storage device, as is associated with a distributed system. It will be appreciated that the network connections shown are exemplary and other means of establishing a communications link between the computers can be used.

The computer 902 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented error correction system, comprising:
    an error detection component that collects scores based on word usage in a sequence of multiple words intended to form a fluent language expression, generates a signal for presence of an error in a subsequence of two or more words of the sequence based on the scores, and detects an erroneous subsequence of two or more words in the sequence of multiple words;
    wherein the error detection component operates as a sliding window covering subsequences of two or more words of the sequence of multiple words;
    a potential candidate generation component that generates potential candidate strings of words related to the erroneous subsequence of words from a corpus, each of the candidate strings having a variable number of words compared a number of words of the erroneous subsequence;
    a candidate selection component that selects and presents one or more of the potential candidate strings as candidate strings for correction of language fluency introduced by the erroneous subsequence of words; and
    a processor that executes computer-executable instructions associated with at least one of the error detection component, potential candidate generation component, or candidate selection component.

2. The system of claim 1, wherein the error detection component detects the erroneous subsequence of words based on scores from at least one of multiple language models or phrase count tables that detect an unlikely sequence of words.

3. The system of claim 1, wherein the candidate selection component selects a candidate string based on a score of the potential candidate strings from an associated language model.

4. The system of claim 1, wherein the scores for error detection are used as features in a classification or sequence model that learns how scores of the language models indicate presence of the erroneous subsequence of words.

5. The system of claim 1, wherein the corpus used by the potential candidate generation component is represented as a suffix array.

6. The system of claim 1, wherein the potential candidate generation component generates the potential candidate strings from a corpus based on context.

7. The system of claim 1, wherein the potential candidate generation component generates the potential candidate strings based on comparison of number of words in the potential candidate strings to number of words in the erroneous subsequence.

8. The system of claim 1, wherein the potential candidate generation component generates the potential candidate strings based on number of words in the potential candidate strings that match words in the erroneous subsequence.

9. A computer-implemented error correction method, comprising acts of:
    receiving a sequence of multiple words intended to form a fluent language expression;
    detecting an erroneous subsequence of two or more words in the sequence of multiple words defined by a sliding window covering subsequences of two or more words of the sequence of multiple words;
    generating potential candidate strings of words related to the erroneous subsequence of words from a corpus of alternative arrangements of same or similar words, or subsequences of words in a same context, each of the candidate strings having a variable number of words compared a number of words of the erroneous subsequence;
    selecting candidate strings from one or more of the potential candidate strings for correction of dysfluency of the language expression by the erroneous subsequence of words and presenting potential corrections to a user; and
    utilizing a processor that executes instructions stored in memory to perform at least one of the acts of detecting, generating, or selecting.

10. The method of claim 9, further comprising collecting scores from one or more language models and processing the scores to detect the erroneous subsequence of words.

11. The method of claim 9, further comprising utilizing language model scores in a sequence model to detect the erroneous subsequence of words in the intended fluent language expression and location of the subsequence in the expression.

12. The method of claim 9, further comprising finding a most likely sequence of error and non-error states based on language model scores.

13. The method of claim 9, further comprising presenting only candidate strings that rank higher than the sequence of words under detection.

14. The method of claim 9, further comprising selecting and presenting only a top number of candidate strings based on a ranking component that ranks the candidate strings.

15. A computer-implemented error correction method, comprising acts of:
   receiving a sequence of multiple words intended to form a fluent language expression;
   collecting scores from one or more language models based on subsequences of two or more words in the sequence of multiple words defined by a sliding window covering two or more words of the sequence of multiple words;
   detecting an erroneous subsequence of two or more words based on the scores collected for each subsequence of words in the sequence;
   generating potential candidate strings of words related to the erroneous subsequence of words from a corpus of alternative arrangements of same or similar words or subsequences of words, based on context-related criteria, each of the candidate strings having a variable number of words compared a number of words of the erroneous subsequence;
   selecting candidate strings from the one or more of the potential candidate strings for correction of dysfluency of the language expression by the erroneous subsequence of words and presenting the candidate strings to a user as corrections to the dysfluency; and
   utilizing a processor that executes instructions stored in memory to perform at least one of the acts of collecting, detecting, generating, or selecting.

16. The method of claim 15, further comprising detecting the erroneous sequence of words based on unlikelihood of an entirety of the sequence of words in the sliding window being correct.

17. The method of claim 15, further comprising selecting the candidate strings based on context-related criteria that is at least one of n-word distance from an original corresponding input sequence, semantically similar words to the original intended expression, or morphologically similar words in the original intended expression.

18. The method of claim 15, further comprising selecting the candidate strings based on context-related criteria that includes comparison of a number of words in the candidates strings to number of words in the erroneous subsequence or a number of words in the candidate strings that match words in the erroneous subsequence.

19. The method of claim 15, further comprising presenting a subset of the candidate strings that rank higher than an original corresponding input sequence of words defined by the sliding window.

* * * * *